UNITED STATES PATENT OFFICE.

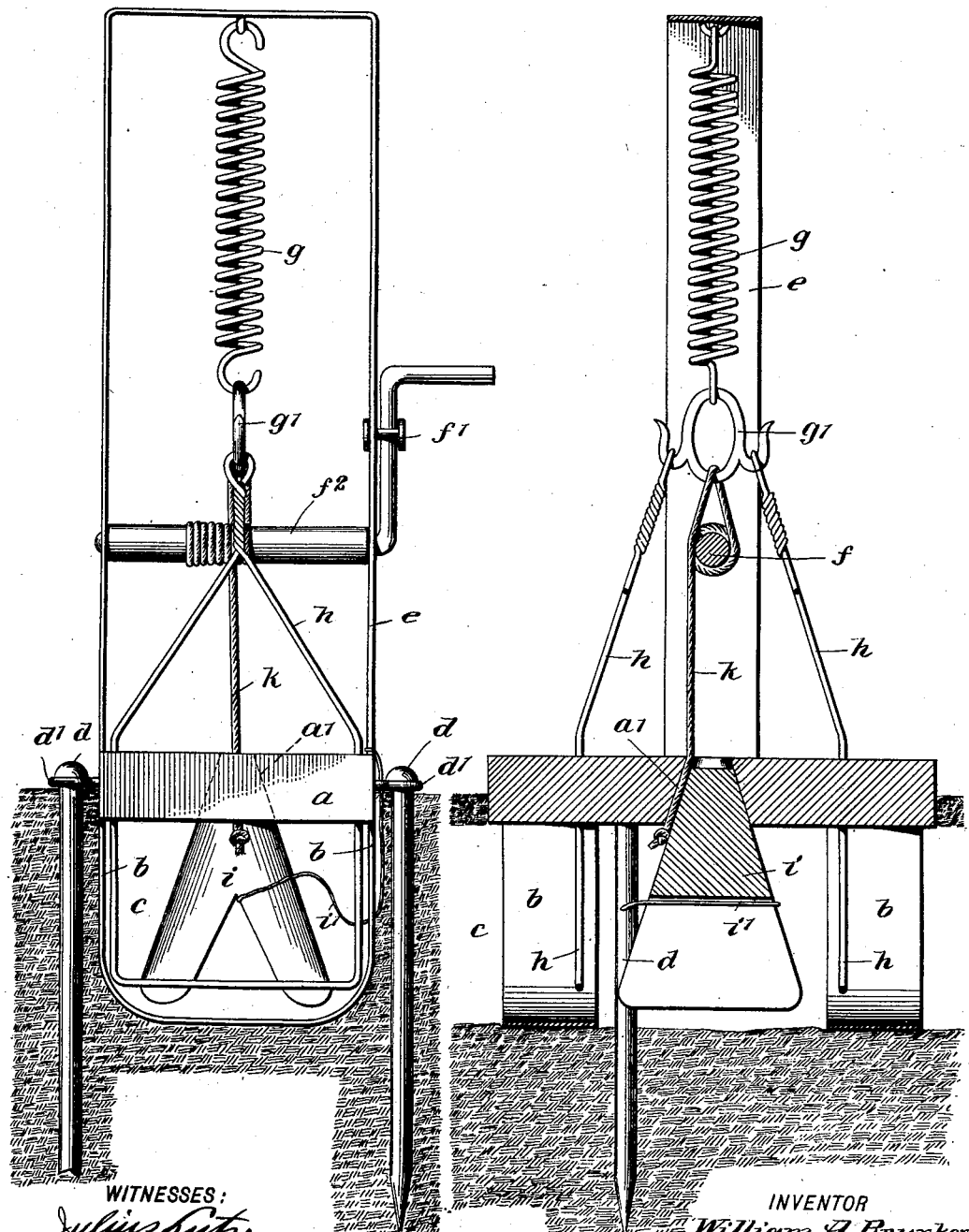

WILLIAM ALFRED BRUNKER, OF FARMERSBURG, INDIANA.

TRAP.

SPECIFICATION forming part of Letters Patent No. 678,220, dated July 9, 1901.

Application filed March 21, 1901. Serial No. 52,195. (No model.)

*To all whom it may concern:*

Be it known that I, WILLIAM ALFRED BRUNKER, a citizen of the United States, and a resident of Farmersburg, in the county of Sullivan and State of Indiana, have invented a new and Improved Trap, of which the following is a full, clear, and exact description.

This invention relates to a trap for catching moles and other animals that burrow under ground, particularly those that follow through an underground passage constructed by themselves.

This specification is a specific description of one form of the invention, while the claims are definitions of the actual scope thereof.

Reference is to be had to the accompanying drawings, forming a part of this specification, in which similar characters of reference indicate corresponding parts in both views.

Figure 1 is an end elevation of the invention, and Fig. 2 is a longitudinal section thereof.

$a$ indicates the base or body of the trap, which is provided with two downwardly-projected yokes $b$, arranged one near each end and adapted to be extended down into the burrow of the animal, the base $a$ being placed on or just below the surface of the earth. In the drawings the burrow is represented at the letter $c$. The side edges of the body are provided with ears $d'$, which receive headed spikes or stakes $d$, driven into the ground at the sides of the burrow to hold the trap in place.

Erected on the base $a$ is a scaffold $e$, in which is arranged a sort of windlass $f$. At one side of the scaffold is located a releasable catch $f'$ for the crank of the windlass. Attached to the top of the scaffold $e$ is a strong retractile spring $g$, carrying at its lower end a thimble $g'$, to which are connected two slings $h$. These slings are formed of some pliable or flexible material, such as copper wire, and they pass through openings in the base to a point below the same. The slings are located, respectively, adjacent to the yokes $b$, and when the trap is set the lower parts of the slings lie within the yokes.

$i$ indicates a forked plug, which for convenience is attached to a slight wire or cord $i'$, serving to prevent the loss of the plug. This plug is fittable within an orifice $a'$ in approximately the center of the base and serves removably to hold one end of a cord $k$. The cord $k$ is rove through the thimble $g'$ and then carried down to the windlass $f$.

In setting the trap the windlass $f$ is operated to draw down the spring $g$, the plug $i$ being first placed in position, as shown. This slacks up the slings $h$ and allows them to assume the position shown in the drawings. The catch $f'$ is now engaged with the handle of the windlass to keep the spring under tension. As the animal moves through the burrow and seeks to pass the trap the plug $i$ will be dislodged from the orifice $a'$ and the cord $k$ released. The spring $g$ will then be permitted to return, bringing the slings with it and capturing the victim by forcing and holding it against the bottom of the base $a$.

The trap may be repeatedly set and will, as a rule, require no repairing, excepting occasionally a new cord $k$ must be provided. It is absolutely certain of its victim, since the forked plug must be dislodged for the animal to pass, and to dislodge the plug the animal must come within the slings. The plug is forked and tapered, so that it will occupy the major portion of the burrow. If desired, the plug may be grooved to receive the cord; but this is not essential.

Having thus described my invention, I claim as new and desire to secure by Letters Patent—

1. A trap having a base, a victim-engaging device, a spring in connection with the victim-engaging device, a winding device, a cord connected with the winding device and engaged with the spring to hold it under tension, and a victim-started trip device for holding the cord in engagement with the spring.

2. A trap having a base, a scaffold therein, a spring sustained on the scaffold, a victim-engaging device connected with the spring, a winding device, a cord connected therewith and engaged with the spring, and a victim-started trip device engaging the cord to hold it in active adjustment.

3. A trap having a base, a scaffold thereon, a spring sustained on the scaffold, a windlass on the scaffold, a cord connected to the windlass and engaging the spring, a victim-started plug fitted removably in the base and holding the string in engagement with the spring to keep the latter under tension, and a victim-engaging device connected with the spring.

In testimony whereof I have signed my name to this specification in the presence of two subscribing witnesses.

WILLIAM ALFRED BRUNKER.

Witnesses:
EDWIN FORD,
WILLIAM E. JOHNS.